United States Patent [19]

Mizuhara et al.

[11] Patent Number: 4,501,547
[45] Date of Patent: Feb. 26, 1985

[54] APPARATUS FOR SHAPING COILED SLIDE FASTENER COUPLING ELEMENTS

[75] Inventors: Hisayoshi Mizuhara, Kurobe; Shigenori Omori, Uozu; Akira Tanaka, Kurobe, all of Japan

[73] Assignee: Yoshida Kogyo K. K., Tokyo, Japan

[21] Appl. No.: 482,492

[22] Filed: Apr. 6, 1983

[30] Foreign Application Priority Data

Apr. 13, 1982 [JP] Japan .................................. 57-61358

[51] Int. Cl.³ ............................................ B28B 11/08
[52] U.S. Cl. .................................... 425/391; 425/319; 425/393
[58] Field of Search .......................... 425/319, 391, 393

[56] References Cited

U.S. PATENT DOCUMENTS

| 3,137,037 | 6/1964 | Wilcken | 425/391 |
| 3,262,157 | 7/1966 | Fujisaki | 425/391 |
| 3,353,217 | 11/1967 | Bashover | 425/391 |
| 4,002,278 | 1/1977 | Omori et al. | 226/1 |
| 4,325,184 | 4/1982 | Omori | 425/391 |

FOREIGN PATENT DOCUMENTS 46-1132 1/1971 Japan .

Primary Examiner—Paul Lieberman
Assistant Examiner—Willie Thompson
Attorney, Agent, or Firm—Hill, Van Santen, Steadman & Simpson

[57] ABSTRACT

A coupling element shaper comprises a pair of parallel externally threaded screw members corotatable in a common direction and disposed on opposite sides of a mandrel along which a core thread is fed while a filamentary material is wound around the mandrel into a row of helically coiled coupling elements. Each screw member has a portion varying in pitch to gradually reduce in a direction from one end to the opposite end thereof. The core thread is squeezed by the coupling elements as shaped by such portion so as to have a certain degree of stretchability which can cancel or take out its shrinkage when the coupling elements are sewn to a slide fastener stringer tape.

12 Claims, 6 Drawing Figures

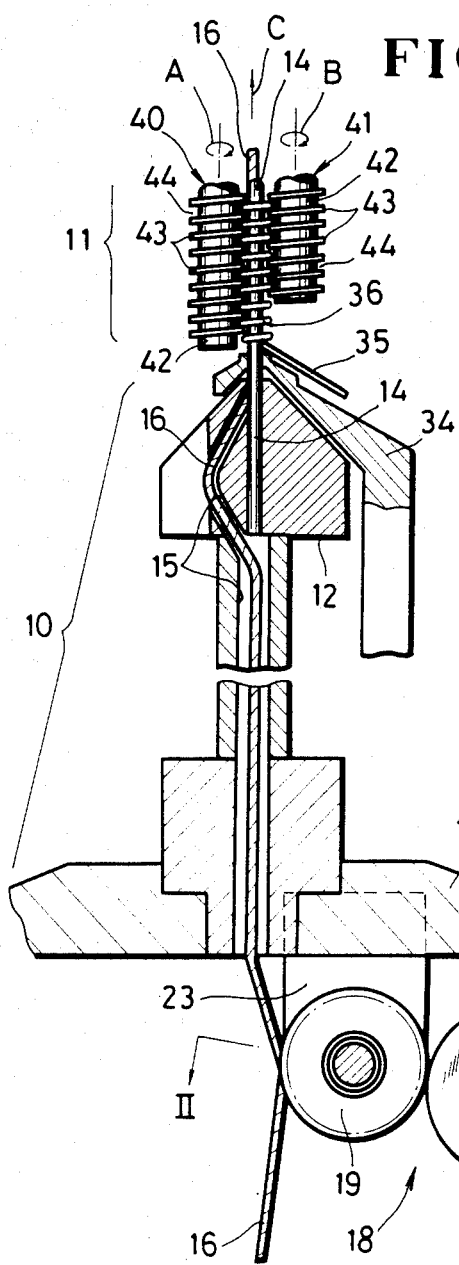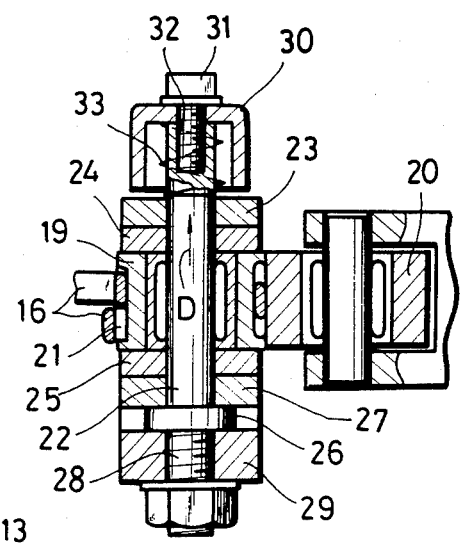

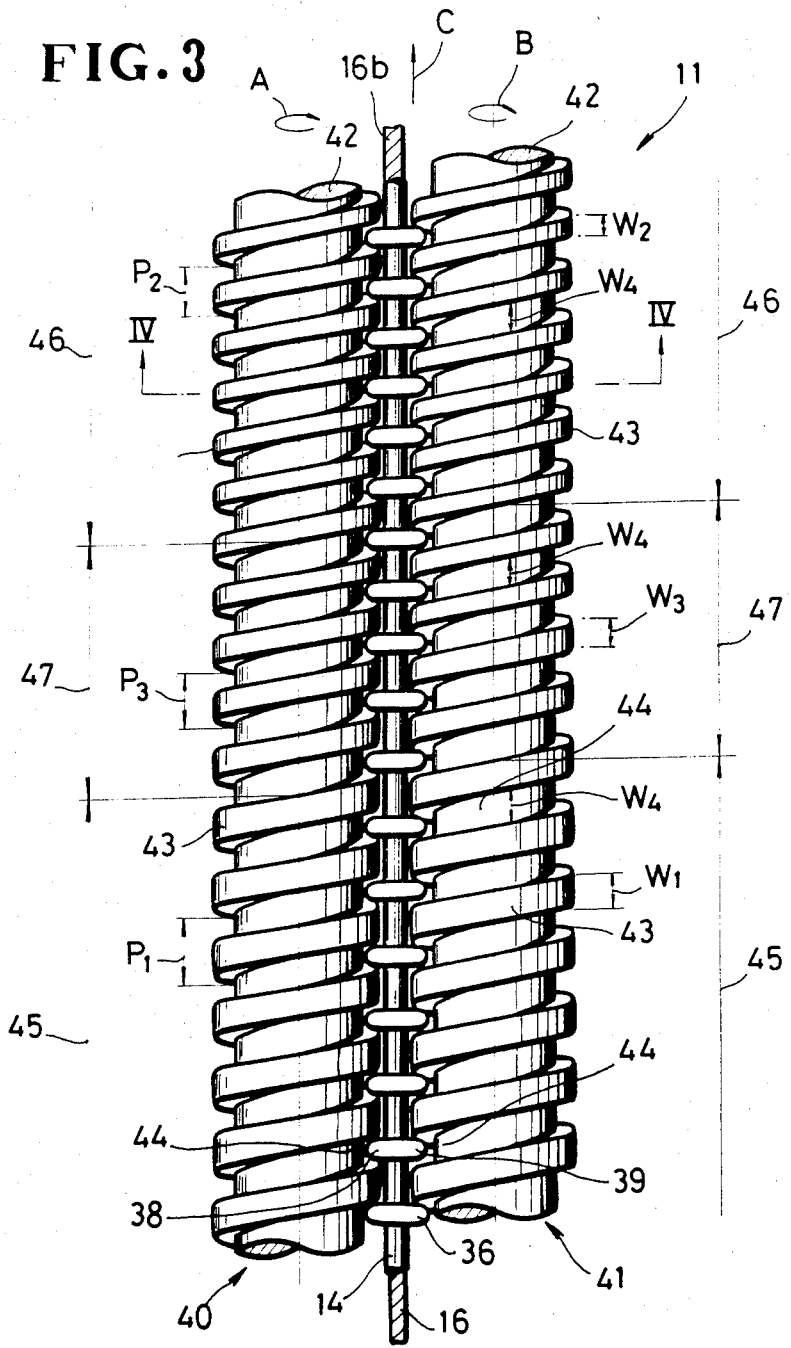

APPARATUS FOR SHAPING COILED SLIDE FASTENER COUPLING ELEMENTS

BACKGROUND OF THE INVENTION

1. Field of the Invention

The present invention relates to an apparatus for shaping a row of helically coiled slide fastener coupling elements containing a core thread extending through a longitudinal space defined in the coupling elements.

2. Prior Art

Japanese Patent Publication No. 46-1132 published on Jan. 12, 1971 and U.S. Pat. No. 4,002,278 issued on Jan. 11, 1977 disclose methods of and apparatus for shaping a filamentary material into a row of helically coiled coupling elements in which a core thread is supplied to a shaping position at a rate greater than the rate at which the coupling elements are formed, or it is fed positively to the shaping position while it is protected from being subjected to an excess back tension or reversely directed force, whereby the core thread as received in the coiled coupling elements becomes slightly slackened between adjacent ones of the coupling elements for cancelling out its shrinkage when the coupling elements are sewn to a slide fastener stringer tape. According to such known methods and apparatus, however, the core thread is not stretchable enough to cancel or taken out such shrinkage. The coupling elements containing such core thread can not be secured to the tape stably in position and is likely to become wavy. Further, the prior methods and apparatus have been found insufficient to control a degree of stretchability of the core thread as received in the coupling elements and maintain such stretchability at a constant rate throughout the length of the core thread.

SUMMARY OF THE INVENTION

A coupling element shaper comprises a mandrel around which a thermoplastic filamentary material is wound into a row of helically coiled coupling elements, the mandrel having a longitudinal groove for the passage therethrough of a core thread adapted to be disposed in a longitudinal space in the coupling elements. A pair of parallel externally threaded cylindrical screw members is disposed on opposite sides of the mandrel in lateral alignment with the same and is corotatable in a common direction. Each of the screw members includes at one end a first portion having a first pitch larger than a pitch of the coupling elemements as shaped, at the opposite end a second portion having a second pitch substantially equal to said pitch of the coupling elements, and a third portion between the first and second portions, gradually reducing in pitch in a direction from the first portion to the second portion. While they are fed by and between the screw members, the coupling elements are shaped to reduced in pitch whereby the core thread is squeezed to reduce its length by a distance corresponding to the difference between the pitches of the first and second portions, and simultaneously to increase its thickness and width. The core thread thus squeezed can be stretched to take out the shrinkage thereof when the coupling elements are sewn to a slide fastener stringer tape.

It is an object of the present invention to provide an apparatus for shaping a row of helically coiled slide fastener coupling elements in which a core thread disposed longitudinally in the coiled coupling elements is squeezed by the coupling elements as shaped so as to have a certain degree of stretchability which corresponds to the shrinkage of the core thread when the coupling elements are sewn to a slide fastener stringer tape.

Another object of the present invention is to provide an apparatus having means for controlling the stretchability of a core thread and maintaining the same at a constant rate throughout the length of the core thread.

Many other advantages, features and additional objects of the present invention will become manifest to those versed in the art upon making reference to the detailed description and the accompanying drawings in which a preferred structural embodiment incorporating the principles of the present invention is shown by way of illustrative example.

BRIEF DESCRIPTION OF THE DRAWINGS

FIG. 1 is a fragmentary schematic front elevational view, partly in cross section, of a portion of an apparatus for manufacturing a row of helically coiled slide fastener coupling elements, the portion employing an element shaper according to the present invention;

FIG. 2 is a cross-sectional view taken along line II—II of FIG. 1;

FIG. 3 is an enlarged fragmentary front elevational view of the element shaper;

DETAILED DESCRIPTION

As shown in FIG. 1, an apparatus for continuously manufacturing a row of helically coiled continuous slide fastener coupling elements comprises a coiling machine 10 and a coupling element shaper 11 which embodies the present invention.

Figure 4:
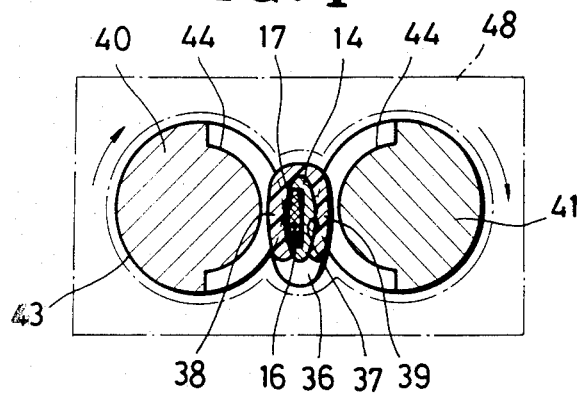
FIG. 4 is a cross-sectional view taken along line IV—IV of FIG. 3.

The coiling machine 10 includes a mandrel holder 12 supported on a frame 13 and supporting a coaxial mandrel 14. The mandrel holder 12 has a through-hole 15 for the passage therethrough of a core thread 16 made for example of a textile material. As shown in FIG. 4, the mandrel 14 has a generally C-shaped cross section and includes a longitudinal groove 17 for receiving therein the core thread 16, the groove 17 communicating at one end with the through-hole 15 (FIG. 1) in the mandrel holder 12.

As shown in FIG. 1, a tension control unit 18 is disposed upstream of the mandrel holder 12 for controlling a tension on the core thread 16. The unit 18 includes a pair of guide and press rollers 19,20 rotatably supported on the frame 13. One turn of the core thread 16 is wound around the guide roller 19 and the press roller 20 is normally urged against the guide roller 19. As shown in FIG. 2, the guide roller 19 has a circumferential groove 21 for receiving therein a loop or one turn of the core thread 16. The roller 19 is rotatably mounted on a collared shaft 22 journaled on a bracket 23 secured to the frame 13 (FIG. 1) with a pair of friction discs or rings 24,25 disposed one on each side of the roller 19. The disc 24 is interposed between the roller 19 and the bracket 23, and the disc 25 is interposed between the roller 19 and a flange or collar 26 of the shaft 22, a ring washer 27 being interposed between the disc 25 and the collar 26. The shaft 22 has an externally threaded portion 28 extending from the collar 26 away from the roller 19 and a nut 29 is threaded over the portion 28. A cup-shaped spring case 30 is secured to an end of the shaft 22 remote from the threaded portion 28 by means of a screw 31 threaded into an internally threaded bore 32 in the shaft 22. A compression spring 33 is fitted over the shaft 22 and acts between the case 30 and the bracket 32 to urge the shaft 22 toward a direction indicated by the arrow D, thereby bringing the parts 24,29,26 and 27 into pressed engagement with one another between the bracket 23 and the collar 26. Such pressed engagement causes the guide roller 19 to rotate under a constant braking force. Thus the core thread 16 is subjected to a uniform tension while it is passing around the guide roller 19 rotating under the constant braking force. The braking force can be adjusted by replacing the spring 33 with another spring having a different spring constant.

Figure 6:
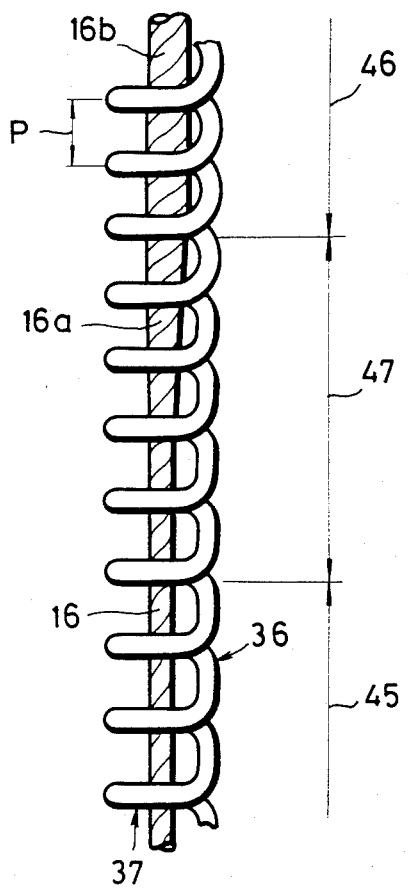
FIG. 6 is an enlarged fragmentary front elevational view of a row of helically coiled coupling elements as it is being shaped by the element shaper.

The coiling machine 10 shown in FIG. 1 also includes a coiling rotor 34 rotatably mounted on the frame 13 for coiling a thermoplastic filamentary material 35 around the mandrel 14 into a row of successively formed helical coupling elements 36. The helically coiled coupling elements 36 thus formed define a space 37 (FIGS. 4 and 6) extending longitudinally therethrough for receiving therein the core thread 16, each coupling element 36 having a pair of spaced legs 38,39 (FIG. 4) between which the core thread 16 extends. The coupling elements 36 are then introduced into the coupling element shaper 11.

As shown in FIGS. 1 and 3, the coupling element shaper 11 includes a pair of parallel externally threaded cylindrical screw members 40,41 disposed on opposite sides of the mandrel 14 in lateral alignment with the same, the mandrel 14 also constituting a part of the coupling element shaper 11. The screw members 40,41 are connected to a driving mechanism (not shown) for being driven to corotate in a common direction indicated by the arrows A and B, thereby feeding the coiled coupling elements 36 longitudinally in a direction of the arrow C together with the core thread 16 disposed in the longitudinal space 37 (FIGS. 4 and 6) in the coupling elements 36. Each of the screw members 40,41 includes a cylindrical shank 42 and a continuous helical rib or thread 43, there being defined a helical groove 44 between the shank 42 and the turns of the thread 43. As better shown in FIG. 4, the screw members 40,41 are spaced from each other such that one leg 38 or 39 of each pair of the spaced legs 38,39 of the coupling elements 36 is received in the groove 44 in the corresponding screw member 40 or 41.

Figure 5:
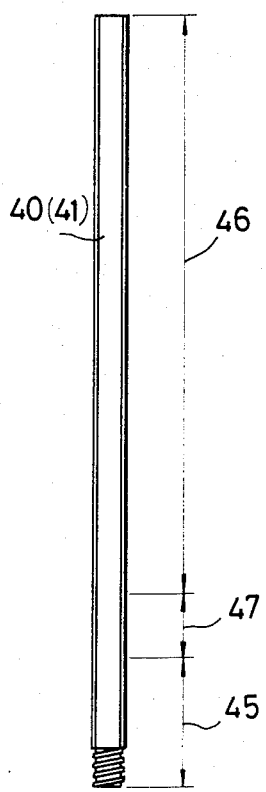
FIG. 5 is a schematic front elevational view of one externally threaded cylindrical screw member of the element shaper.

As shown in FIG. 3, each screw member 40,41 includes, at one end from which the helically coiled coupling elements 36 are successively introduced into the helical groove 44, a first portion 45 having a pitch $P_1$ larger than a predetermined pitch P (FIG. 6) of the coupling elements 36 which has been shaped by the coupling element shaper 11. At the opposite end thereof, the screw member 40,41 includes a second portion 46 having a pitch $P_2$ substantially equal to the predetermined pitch P of the coupling element 36 as shaped. The screw member 40,41 further has a third portion 47 between the first and second portions 45,46, gradually reducing in pitch $P_3$ in a direction from said one end to the opposite end. The threads 43 are substantially square shaped and, in the first and second portions 45,46, have uniform widths $W_1,W_2$, respectively. In the third portion 47, the threads 43 vary in width $W_3$ to reduce gradually in a direction from the first portion 45 to the second portion 46. The width $W_1$ is larger than the widths $W_2$ and $W_3$. The helical grooves 44,44 have a uniform width $W_4$ throughout the length of the respective screw members 40,41. As shown in FIG. 5, the second portion 46 is longer than the first and third portions 45,47 for accurate shaping of the coupling elements 36. The first portion 45 is longer than the third portion 46.

As shown in FIG. 4, a heating means 48 (indicated by dash-and-dot lines) is disposed over at least the second portions 46,46 of the screw members 40,41 to heat-set the helically coiled coupling elements 36 while the latter is being shaped by the screw members 40,41.

Operation of the apparatus thus constructed is as follows: The thermoplastic filamentary material 35 is continuously wound by the rotor 34 around the mandrel 14 into a row of helically coiled coupling elements 36. At the same time, the core thread 16 is continuously fed around the guide roller 19 through the hole 15 into the groove 17 in the mandrel 14 and hence is inserted into the longitudinal space 37 in the formed coupling elements 36. The coupling elements 36 wound on the mandrel 14 are successively introduced in the helical grooves 44,44 in the screw members 40,41 which are rotating in the direction of the arrows A and B, and then they are fed by the screw members 40,41 in the direction of the arrow C with one leg 38 or 39 of each pair of spaced legs 38,39 of the coupling elements 36 received in one of the grooves 44,44 of the corresponding screw member 40 or 41 (FIG. 4). The core thread 16 which is received in the groove 17 in the mandrel 14 between the legs 38 and the mandrel 14 is fed in the direction of the arrow C as the coupling elements 36 are fed by the screw members 40,41.

The coupling elements 36 while advancing through the first portions 45,45 of the screw members 40,41 are shaped to have a pitch which corresponds to the pitch $P_1$ of the first portions 45,45.

Due to the third portions 47,47 varying in pitch $P_3$ to reduce gradually in the direction of the arrow C, the coupling elements 36 are shaped to have correspondingly varying pitches while they are fed through the third portions 47,47. During that time, the core thread 16 is compressed or squeezed as at 16a of FIG. 6 by adjacent legs 38 or 39 in the longitudinal direction thereof to gradually reduce its length and simultaneously to increase its thickness and width.

The coupling elements 36 are finally shaped and heat-set to have the pitch P while they pass through the heated second portions 46,46 having the pitch $P_2$ substantially eual to the pitch P. During that time, the core thread 16a is squeezed as at 16b of FIG. 6. The core thread 16 has now been reduced in length by a distance $(P_1-P_2)$ and simultaneously increased in thickness and width. The core thread 16b thus squeezed is stretchable to such an extent corresponding to the distance $(P_1-P_2)$ so as to take out its shrinkage when the coupling elements 36 are sewn to a slide fastener stringer tape (not shown). The amount of squeezing or the stretchability of the core thread 16b is uniform throughout the entire length thereof and can be varied by changing the distance $(P_1-P_2)$. Fine adjustment of the stretchability can be achieved by controlling the braking force on the roller 19.

With the arrangement of the present invention, the core thread has a certain degree of stretchability which corresponds to its shrinkage when the coupling elements are sewn to the slide fastener stringer tape. Such degree of stretchability can be controlled by the screw members having the respective third portions varying in pitch to gradually reduce in a direction from one end to the opposite end of the screw members. The second portions of the respective screw members, which are contiguous to the third portions and have a uniform pitch, maintain the stretchability of the core thread at a constant rate throughout the entire length thereof. The coupling element shaper is simple in construction, reliable in function and easy to maintain.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. An apparatus for shaping a row of helically coiled continuous coupling elements defining therein a longitudinal space receiving therein a continuous core thread, each coupling element having a pair of spaced legs, said apparatus comprising:
   (a) a mandrel for having wound thereon the coiled coupling elements and having a longitudinal groove for the passage therethrough of the core thread; and
   (b) a pair of parallel externally threaded cylindrical screw members disposed on opposite sides of said mandrel in lateral alignment with the same and drivably corotatable in a common direction to feed the coupling elements and the core thread on said mandrel longitudinally from one end to the opposite end of said screw members, each said screw member having a cylindrical shank and a continuous helical thread on said shank defining a helical groove between turns thereof for receiving therein one leg of each pair of spaced legs of the coupling elements, each said screw member including at said one end a first portion having a first pitch larger than a predetermined pitch of the coupling elements as ultimately shaped, at said opposite end a second portion having a second pitch substantially equal to said predetermined pitch, and a third portion between said first and second portions, gradually reducing in pitch in a direction from said one end toward said opposite end.

2. An apparatus according to claim 1, said second portion being longer than said first and third portions.

3. An apparatus according to claim 2, said first portion being longer than said third portion.

4. An apparatus according to claim 1, said threads being substantially square shaped in radial cross section.

5. An apparatus according to claim 1, said helical groove having a uniform axial width throughout the length of said screw member.

6. An apparatus according to claim 1, said second portion being longer than said first and third portions.

7. An apparatus according to claim 1, said first portion being longer than said third portion.

8. An apparatus according to claim 1, said threads being substantially square shaped in radial cross section.

9. An apparatus according to claim 1, said helical groove having a uniform axial width throughout the length of said screw member.

10. An apparatus according to claim 1, said applying means including a pair of friction discs disposed one on each side of said one roller, and a spring urging said friction discs and said one roller into pressed engagement with one another.

11. An apparatus according to claim 10, said tension control means including a fixed bracket, a shaft journalled on said bracket and having a collar at one end thereof, and a spring cover secured to the opposite end of said shaft, said one roller and said friction discs being rotatably mounted on said shaft between said bracket and said collar, said spring being disposed on said shaft between said cover and said bracket.

12. An apparatus for shaping a row of helically coiled continuous coupling elements defining therein a longitudinal space receiving therein a continuous core thread, each coupling element having a pair of spaced legs, said apparatus comprising:
   (a) a mandrel for having wound thereon the coiled coupling elements and having a longitudinal groove for the passage therethrough of the core thread;
   (b) a pair of parallel externally threaded cylindrical screw members disposed on opposite sides of said mandrel in lateral alignment with the same and drivably corotatable in a common direction to feed the coupling elements and the core thread on said mandrel longitudinally from one end to the opposite end of said screw members, each said screw member having a cylindrical shank and a continuous helical thread on said shank defining a helical groove between turns thereof for receiving therein one leg of each pair of spaced legs of the coupling elements, each said screw member including at said one end a first portion having a first pitch larger than a predetermined pitch of the coupling elements as ultimately shaped, at said opposite end a second portion having a second pitch substantially equal to said predetermined pitch, and a third portion between said first and second portions, gradually reducing in pitch in a direction from said one end toward said opposite end; and
   (c) means disposed upstream of said mandrel for controlling and maintaining a tension on the core thread, said tension control means including a pair of rollers normally urged against each other, one of said rollers being adapted to have one turn of the core thread wound therearound, and means associated with said one roller for applying a braking force to said one roller while said one roller is being rotated.

* * * * *